(12) United States Patent
Soma

(10) Patent No.: US 10,279,671 B2
(45) Date of Patent: May 7, 2019

(54) ENGINE MOUNTING STRUCTURE

(71) Applicant: KURASHIKI KAKO CO., LTD., Okayama (JP)

(72) Inventor: Prabhakar Soma, Okayama (JP)

(73) Assignee: KURASHIKI KAKO CO., LTD., Kurashiki-Shi (JP)

( * ) Notice: Subject to any disclaimer, the term of this patent is extended or adjusted under 35 U.S.C. 154(b) by 0 days.

(21) Appl. No.: 15/761,107

(22) PCT Filed: Sep. 13, 2016

(86) PCT No.: PCT/JP2016/004164
§ 371 (c)(1),
(2) Date: Mar. 18, 2018

(87) PCT Pub. No.: WO2017/056415
PCT Pub. Date: Apr. 6, 2017

(65) Prior Publication Data
US 2018/0257471 A1 Sep. 13, 2018

(30) Foreign Application Priority Data
Sep. 30, 2015 (JP) .................. 2015-194785

(51) Int. Cl.
*B60K 5/12* (2006.01)
*F16F 1/371* (2006.01)
*F16F 1/376* (2006.01)
*F16F 1/373* (2006.01)
*F16F 1/38* (2006.01)

(52) U.S. Cl.
CPC ............. *B60K 5/1208* (2013.01); *B60K 5/12* (2013.01); *B60K 5/1216* (2013.01); *B60K 5/1225* (2013.01); *F16F 1/371* (2013.01); *F16F 1/373* (2013.01); *F16F 1/376* (2013.01); *F16F 1/3828* (2013.01); *F16F 2230/0005* (2013.01)

(58) Field of Classification Search
USPC ........................................ 248/573
See application file for complete search history.

(56) References Cited

U.S. PATENT DOCUMENTS

| 7,278,633 | B2 * | 10/2007 | Yamamoto | F16F 13/101 |
| | | | | 267/140.13 |
| 8,348,007 | B2 * | 1/2013 | Hermann | B60K 5/1208 |
| | | | | 180/312 |
| 9,145,046 | B2 * | 9/2015 | Okanaka | B60K 5/1208 |

(Continued)

FOREIGN PATENT DOCUMENTS

| DE | 10 2012 106 064 A1 | 2/2014 |
| DE | 10 2012 110 480 A1 | 5/2014 |

(Continued)

*Primary Examiner* — Monica E Millner
(74) *Attorney, Agent, or Firm* — Maschoff Brennan

(57) ABSTRACT

A protrusion (54) acting as an engagement portion is provided to a root (52) of a spindle (5) to an engine. An extending portion (45) extending above the root (52) of the spindle (5) is provided to a stopper (4). An opening (46) acting as a coupler is provided to the extending portion (45). The protrusion (54) and the opening (46) engage with each other, thereby reducing the risk of the spindle (5) coming off and regulating relative displacement of an upper rigid member (2) supporting the spindle (5) inserted into the upper rigid member (2).

3 Claims, 9 Drawing Sheets

(56) References Cited

U.S. PATENT DOCUMENTS

| | | | |
|---|---|---|---|
| 2009/0174126 A1* | 7/2009 | Takeshima | B60K 5/1208 267/140.4 |
| 2010/0059912 A1* | 3/2010 | Takakura | B60K 5/1208 267/140.12 |
| 2011/0056761 A1* | 3/2011 | Weissbecker | B60K 5/1208 180/382 |
| 2012/0267186 A1 | 10/2012 | Hermann et al. | |
| 2015/0345583 A1* | 12/2015 | Ishikawa | F16F 3/0873 248/634 |
| 2017/0276201 A1 | 9/2017 | Scharf et al. | |
| 2017/0299007 A1 | 10/2017 | Scharf et al. | |

FOREIGN PATENT DOCUMENTS

| | | |
|---|---|---|
| EP | 2642152 A4 * | 11/2017 |
| JP | 2006-161973 A | 6/2006 |
| JP | 2012-036971 A | 2/2012 |
| JP | 2012-116242 A | 6/2012 |
| JP | 2012-207708 A | 10/2012 |
| JP | 2013-190037 A | 9/2013 |
| WO | 2009/090071 A2 | 7/2009 |
| WO | 2016/023859 A1 | 2/2016 |
| WO | 2016/026745 A1 | 2/2016 |

* cited by examiner

ENGINE MOUNTING STRUCTURE

TECHNICAL FIELD

A technique disclosed in this description relates to an engine mounting structure.

BACKGROUND ART

An engine mount known in the art is used for mounting an automotive engine on a vehicle body and supporting the automotive engine. The engine mount includes: a lower rigid member secured to the body; an upper rigid member into which a spindle to the engine is inserted; an elastic support connecting the upper rigid member to the lower rigid member and supporting the upper rigid member; and a rigid stopper shaped into a substantial gate as a whole and provided to enclose the upper rigid member and the elastic support.

For example, Patent Document 1 discloses an engine mount including an upper rigid member functioning as a stopper to regulate relative displacement of the upper rigid member in the left-right direction (the spindle inserting direction) of the vehicle. The upper rigid member alleviates interference between, and damage to, the engine and peripheral members, and solves the problem of decreasing steering stability of the vehicle because of inertial resistance caused by the displacement of the engine in the left-right direction of the vehicle.

Moreover, Patent Document 2 discloses an engine mount including an engaging protrusion provided to an insert of a spindle. The engaging protrusion reduces the risk of the spindle coming off from the engine mount.

CITATION LIST

Patent Documents

PATENT DOCUMENT 1: Japanese Unexamined Patent Publication No. 2006-161973
PATENT DOCUMENT 2: Japanese Unexamined Patent Publication No. 2012-036971

SUMMARY

Technical Problem

The engine mount of Patent Document 1 regulates the movement of the upper rigid member. Hence, the engine mount inevitably has a problem that the spindle inserted into the upper rigid member comes off from the upper rigid member if the engine is suddenly displaced.

The engine mount in Patent Document 2 could reduce the risk of the spindle coming off; however, the engine mount cannot regulate the relative displacement of the upper rigid member, which supports the spindle inserted into the upper rigid member, in the left-right direction of the vehicle.

This description is conceived in view of the above problems and intends to improve an engine mounting structure to reduce the risk of a spindle to an engine coming off, and regulate relative displacement of an upper rigid member, which supports the spindle inserted into the upper rigid member, in the left-right direction of a vehicle.

Solution to the Problem

In order to achieve the above intension, the technique disclosed in this description allows an engagement portion to be provided to a spindle itself to an engine and a coupler to be provided to a stopper, and causes the engagement portion and the coupler to engage with each other to reduce the risk of the spindle coming off.

Specifically, a technique disclosed in this description is directed to an engine mounting structure for mounting an automotive engine on an automotive body and supporting the automotive engine. The engine mounting structure includes: a lower rigid member secured to the body; an upper rigid member provided above the lower rigid member, and supporting a spindle to an engine, the spindle being inserted into the upper rigid member; an elastic support connecting the upper rigid member to the lower rigid member and supporting the upper rigid member in a manner that the upper rigid member is movable with respect to the lower rigid member; and a stopper provided to cover from above the upper rigid member and the elastic support, and secured to the lower rigid member, wherein the spindle is provided with an engagement portion, and the stopper is provided with a coupler engaging with the engagement portion, and the engagement portion engages with the coupler so that a movement of the spindle in a direction of the reception is regulated.

In the above configuration, the engagement portion is provided to the spindle itself to the engine, and engages with the coupler provided to the stopper. Hence, the spindle and the stopper directly engage with each other. Such a feature can reliably reduce the risk of the spindle coming off from the upper rigid member. Furthermore, the feature can also regulate relative displacement, in the left-right direction, of the vehicle of the upper rigid member supporting the spindle inserted into the upper rigid member.

The engagement portion may be a protrusion, and the coupler may be either an opening or a recess engaging with the protrusion.

In the above configuration, the engagement portion keeping the spindle from coming off can be provided without reducing the rigidity of the spindle.

The stopper may include an extending portion extending above a root of the spindle, and the engagement portion may be provided facing upward to the root of the spindle, and the coupler may be provided to the extending portion of the stopper.

In the above configuration, the tip end of the spindle can be made lighter. As a result, the inertial resistance at the tip end of the spindle can be reduced, contributing to enhance the rigidity of the root.

Advantages of the Invention

As can be seen, in accordance with the technique disclosed in this description, the engagement portion is formed on the spindle itself, and engages with the coupler of the stopper. Such features make it possible to reliably reduce the risk of the spindle coming off, and regulate relative displacement of an upper rigid member, supporting the spindle inserted into the upper rigid member, in the left-right direction of a vehicle.

DESCRIPTION OF EMBODIMENTS

Figure 1:
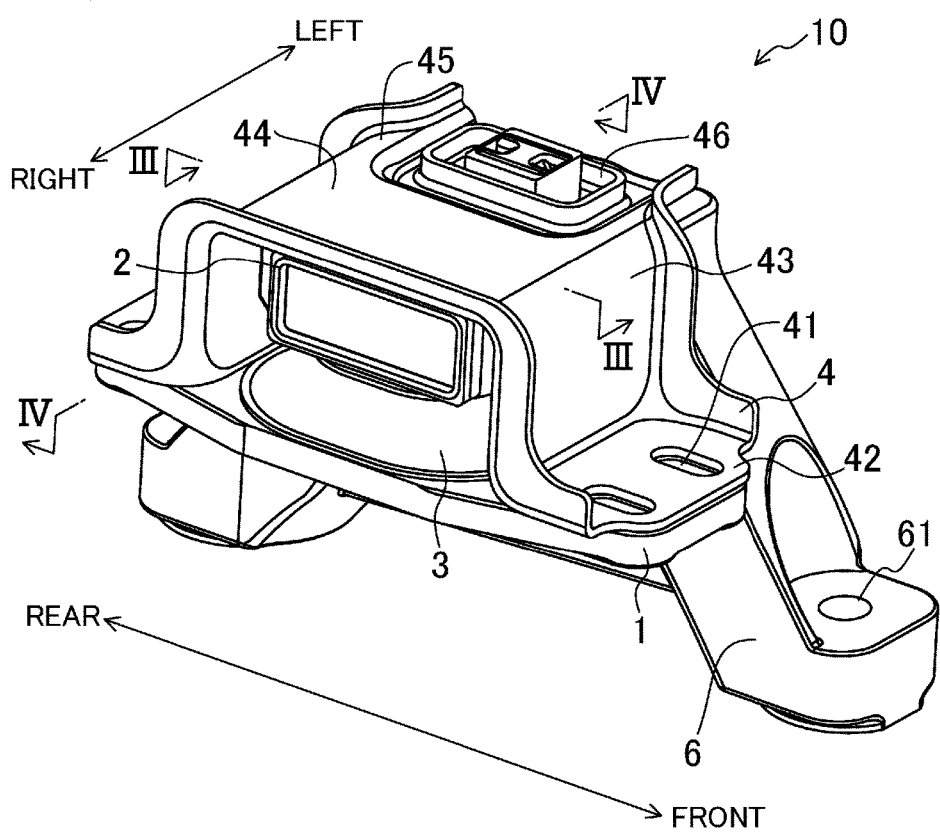
FIG. 1 is a perspective view of an engine mounting structure, observed from the right front, according to a first embodiment.
Figure 2:
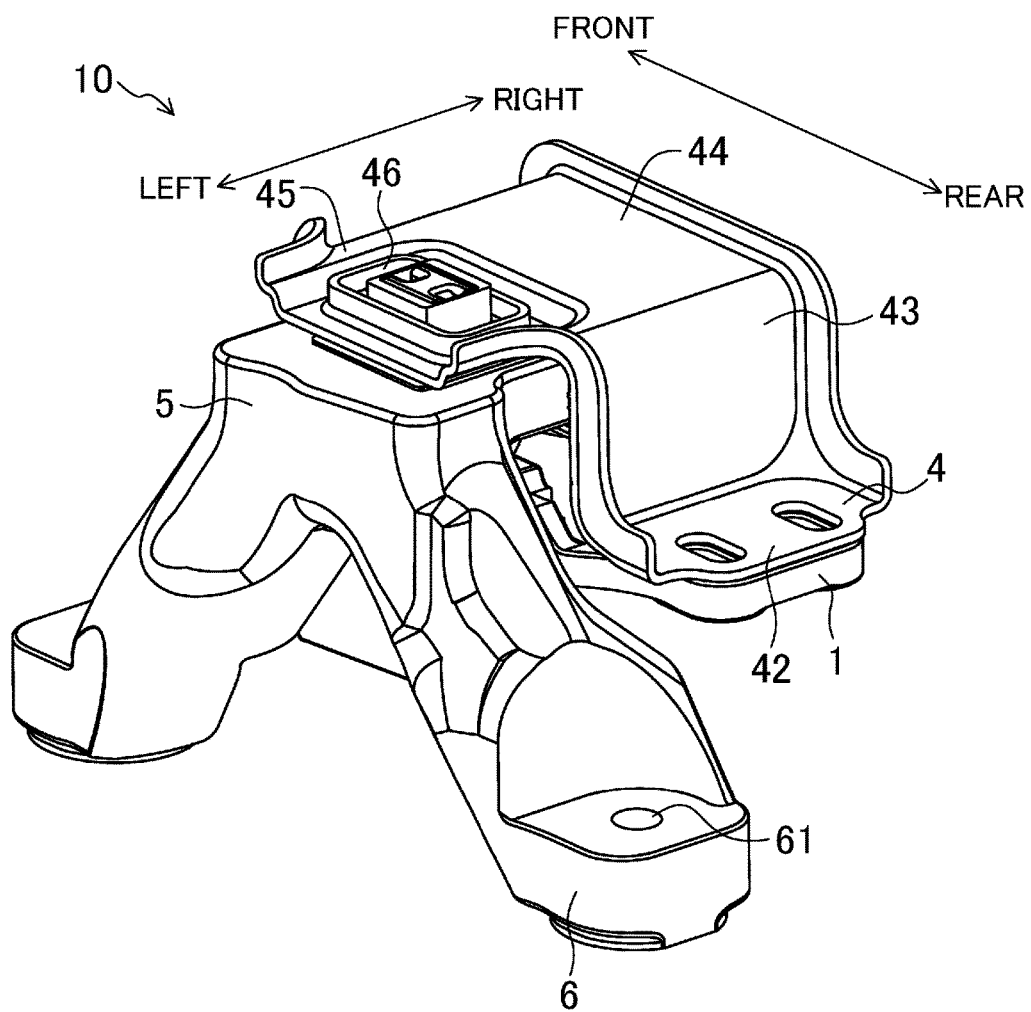
FIG. 2 is a perspective view of the engine mounting structure, observed from the left back (i.e., the opposite view of FIG. 1), according to the first embodiment.
Figure 3:
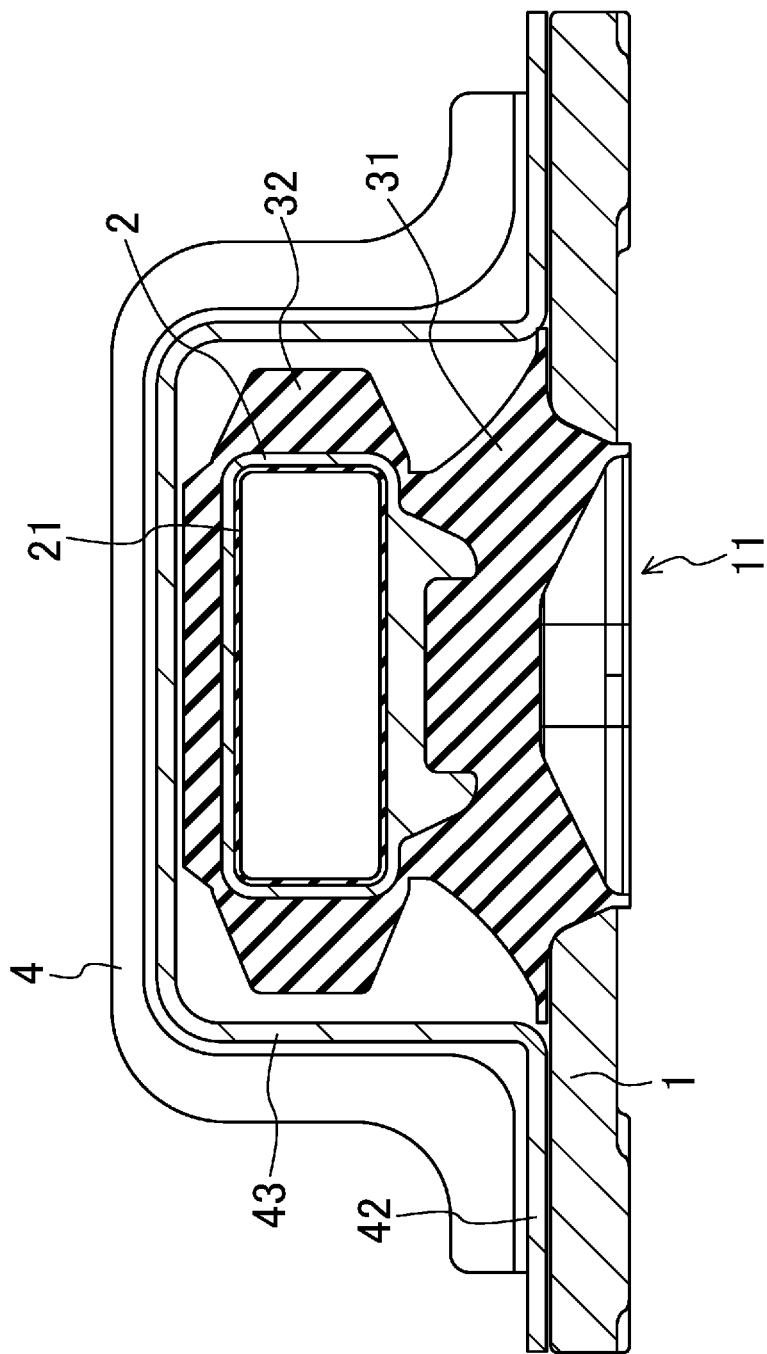
FIG. 3 is a cross-sectional view taken along line of FIG. 1.

Examples of embodiments are described below in detail with reference to the drawings. Note that descriptions of the embodiments below are only an example in nature, and are not intended to limit the scope, applications, or use disclosed in this description.

First Embodiment

FIGS. 1 to 4 illustrate an engine mounting structure 10 according to a first embodiment. This engine mounting structure 10 is for mounting a not-shown automotive engine on a not-shown automotive body and supporting the automotive engine. Specifically, the engine mounting structure 10 includes: a lower rigid member 1 secured to the body; an upper rigid member 2 supporting a spindle 5 to the engine, the spindle 5 being inserted into the upper rigid member 2; an elastic support 3 connecting the upper rigid member 2 to the lower rigid member 1 and supporting the upper rigid member 2 in a manner that the upper rigid member 2 is movable with respect to the lower rigid member 1; and a rigid stopper 4 provided to cover the upper rigid member 2 and the elastic support 3, and secured to the lower rigid member 1.

The lower rigid member 1 is a rectangular metal sheet made of, for example, iron. The lower rigid member 1 is placed on the body in a manner that the longitudinal direction of the lower rigid member 1 is placed along the front-rear direction of the body. The lower rigid member 1 has ends in the longitudinal direction each having two fastening holes (not shown) formed through the end and arranged in the width direction (the left-right direction). As clearly illustrated in FIG. 3, the lower rigid member 1 has a through opening 11 in the longitudinal center of the lower rigid member 1. Then, the lower rigid member 1 is fastened and secured to the body with, for example, a bolt inserted into each fastening hole.

The upper rigid member 2 is provided above the center of the lower rigid member 1. This upper rigid member 2 is shaped into a square tube, and includes therein a spindle inserting hole extending in the left-right direction. Preferably, the upper rigid member 2 is made of a relatively light metal (e.g., aluminum). The spindle inserting hole has an interior wall face coated with a coat 21 including an elastic material such as rubber. As shall be described later, the spindle 5 is inserted into this spindle inserting hole.

The upper rigid member 2 is connected to the lower rigid member 1, provided below the upper rigid member 2, with the elastic support 3 in a manner that the upper rigid member 2 can move with respect to the lower rigid member 1. This elastic support 3 includes a leg 31 and a vibration isolator 32.

The leg 31 is shaped into a dome opening downward. An upper end of the leg 31 is vulcanized and integrally adheres to a lower face of the upper rigid member 2. As clearly illustrated in FIG. 3, a lower portion of the leg 31 extends to bridge over the opening 11 of the lower rigid member 1. A lower end of the leg 31 is vulcanized and integrally adheres to an upper face of the lower rigid member 1. The vibration isolator 32 is vulcanized and integrally adheres to the upper rigid member 2, while surrounding, from above and both of the front and rear sides, an outer periphery face of the upper rigid member 2.

The stopper 4 is made of a substantially U-shaped metal sheet made of, for example, iron. The stopper 4 is provided to cover the elastic support 3 and the upper rigid member 2 from above. The stopper 4 includes: a top plate 44 provided above the elastic support 3 and the upper rigid member 2, and spaced apart from the vibration isolator 32 of the elastic support 3; a pair of legs 43, 43 provided in the front-rear direction, having upper ends each continuing to a corresponding one of front-rear ends of the top plate 44, and extending downward in parallel with each other; and a pair of flanges 42, 42 provided in the front-rear direction, each continuing to a corresponding one of lower ends of these legs 43, 43, and extending in the front-rear direction. Each of the legs 43, 43 is spaced apart from either side of the elastic support 3 and the upper rigid member 2 in the front-rear direction. Each of the flanges 42, 42 is provided to make contact with a corresponding end of the lower rigid member 1 in the front-rear direction. The flange 42 has through fastening holes 41, 41, . . . each positioned to a corresponding one of the fastening holes of the lower rigid member 1. The lower rigid member 1 and the stopper 4 can be fastened together with, for example, bolts inserted into these fastening holes 41, 41.

Figure 4:
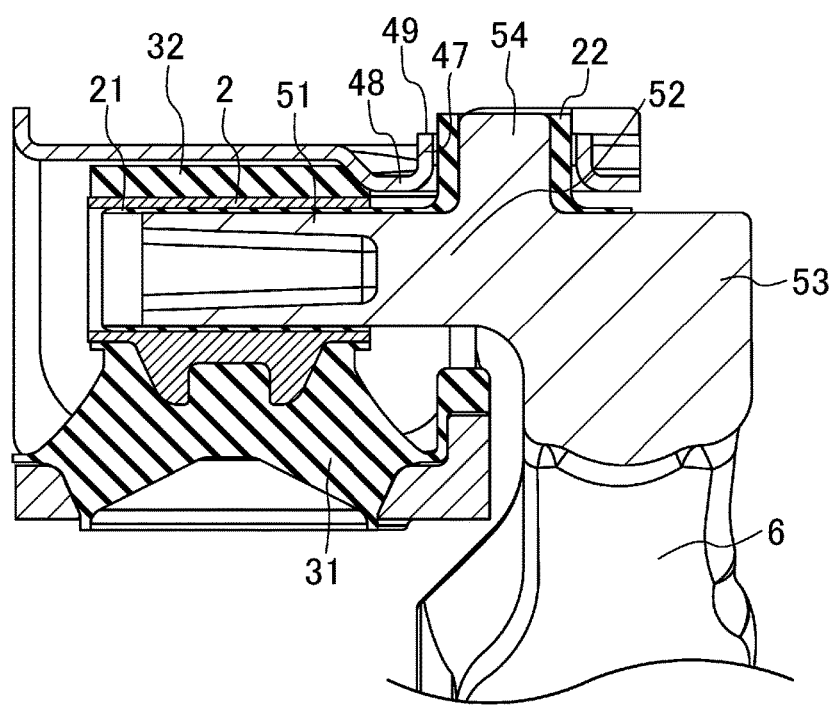
FIG. 4 is a cross-sectional view taken from line IV-IV of FIG. 1.

The spindle 5 is integrally provided to the engine or a powertrain (not shown) connected to, and driven by, the engine. The spindle 5 extends in the left-right direction so that a tip end of the spindle 5 extends toward the right. Specifically, as illustrated in FIG. 4, the spindle 5 has a tip end provided with an insert 51 shaped into a square tube (i.e., a cross-section of which is shaped into a rectangle), and inserted into the spindle inserting hole of the upper rigid member 2. To reduce weight, this insert 51 is hollow inside with a bottomed-end hole having a depth from a tip end face to the vicinity of a root 52 of the spindle 5. The root 52 of the spindle 5 continues to a base 53. This base 53 is connected to a transmission support 6 positioned below the base 53. This transmission support 6 supports a transmission (not shown) to the engine.

As a feature of the technique disclosed in this description, a protrusion 54 shaped into a rectangular column is integrally provided to the front-rear (the width) center of an upper face of the root 52 of the spindle 5. The protrusion 54 acts as an engagement portion protruding upward. A protrusion coat 22 integral with the coat 21 coats the periphery of the protrusion 54 in the front-rear and the left-right directions.

Meanwhile, in the stopper 4, an extending portion 45 shaped into a plate is formed integrally with the top plate 44. The extending portion 45 extends from the left end of top plate 44 toward the left in the same length as the front-rear length of the top plate 44. This extending portion 45 covers the root 52 of the spindle 5 from above, and extends over the root 52 toward the left. The extending portion 45 has a vertically through opening 46 acting as a coupler to engage with the protrusion 54 of the spindle 5. The periphery of the opening 46 is folded upward to be in parallel with an outer periphery face of the protrusion 54 to form a flange 47. This flange 47 has an end face 49 facing upward. In the opening 46, the protrusion 54 is housed to be movable with respect to the opening 46 in a manner that the protrusion coat 22 on the periphery of the protrusion 54 does not make contact with the flange 47 in the left-right and the front-rear directions. Furthermore, a depression 48 is provided to a periphery of the flange 47 of the opening 46. The depression 48 is the periphery of the flange 47 partially depressed to be lower than the top plate 44 and shaped into a loop.

Described below is how the engine mounting structure 10 works while the vehicle is running. When the engine, namely a heavy load, is about to be relatively displaced in the left-right direction with respect to the body while the vehicle is running on a curve, the protrusion 54 of the spindle 5 to the engine in the engine mounting structure 10 of this embodiment engages with the opening 46 of the stopper 4 integral with the body. Such an engagement of this protrusion 54 with the opening 46 of the stopper 4 can reliably reduce the risk of the spindle 5 to the engine coming off from the upper rigid member 2, and regulate the relative displacement of the upper rigid member 2, and supporting the spindle 5 inserted into the upper rigid member 2, in the left-right direction of the vehicle. Hence, the displacement of the engine can be stably regulated.

Moreover, the protrusion 54 provided to the root 52 of the spindle 5 increases the rigidity of the root 52. The increase in rigidity makes it possible to support the engine structure without damage, even if excessive load is imposed on the spindle 5 because of, for example, rough steering.

Moreover, in the spindle 5, the root 52 is provided with the protrusion 54, whereas the tip end of the insert 51 is hollow inside. Thus, the tip end is lighter than the root 52. Such a feature reduces moment of inertia originated in the base end so that inertial resistance by the spindle 5 can be decreased, contributing to reduction in influence of the engine structure on the vehicle.

Moreover, in the stopper 4 of this embodiment, the depression 48 lower than the top plate 44 is provided, and the interior of the depression 48 is provided with the flange 47 facing upward and engaging with the protrusion 54. Thus, the protrusion 54 can be positioned lower than the top plate 44. Such a feature downsizes, for example, a battery tray (not shown) provided on the top plate 44.

Second Embodiment

Figure 5:
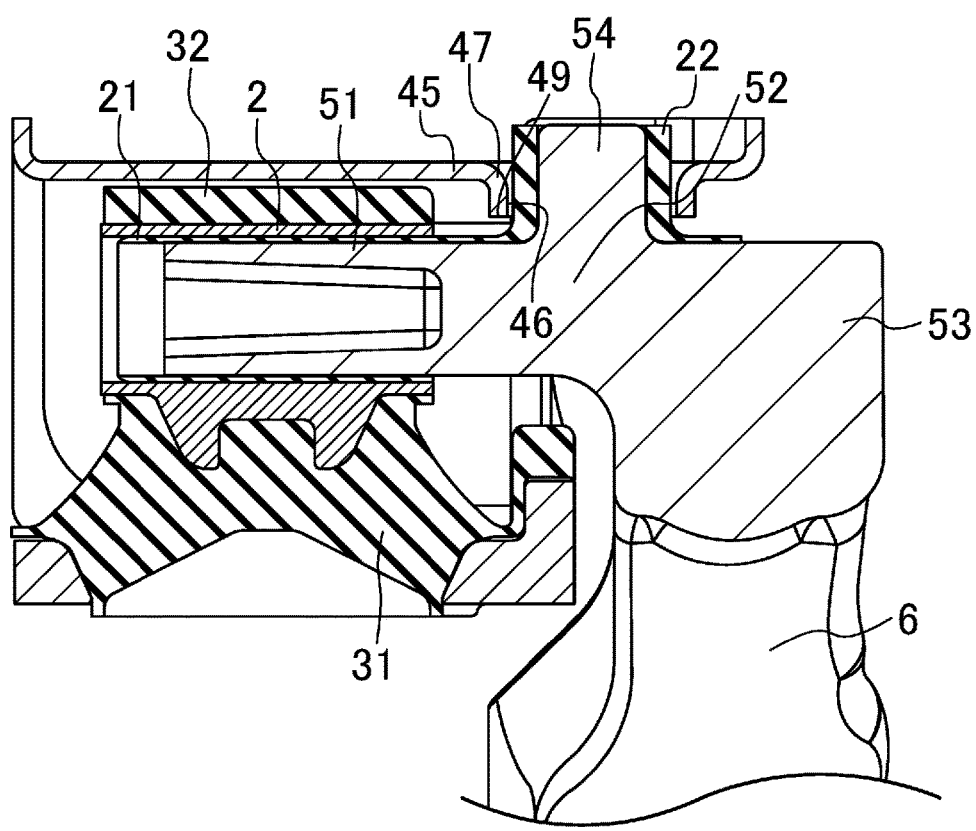
FIG. 5 corresponds to FIG. 4 and illustrates an engine mounting structure according to a second embodiment.

FIG. 5 illustrates a second embodiment. In the embodiment below, parts equivalent to those illustrated in FIGS. 1 to 4 are denoted by the same reference characters, and the detailed explanation thereof will be omitted.

As illustrated in FIG. 5, in the second embodiment, the depression 48 is not formed around the opening 46 of the extending portion 45 in the stopper 4. Instead, the periphery of the opening 46 is folded downward in parallel with the outer periphery face of the protrusion 54 to form the flange 47. This flange 47 has the end face 49 facing downward. In this case, the depression 48, which is lower than the top plate 44, is not formed. This feature is beneficial in providing a clearance below the extending portion 45. Such a feature can also achieve an effect similar to that in the first embodiment.

Third Embodiment

Figure 6:
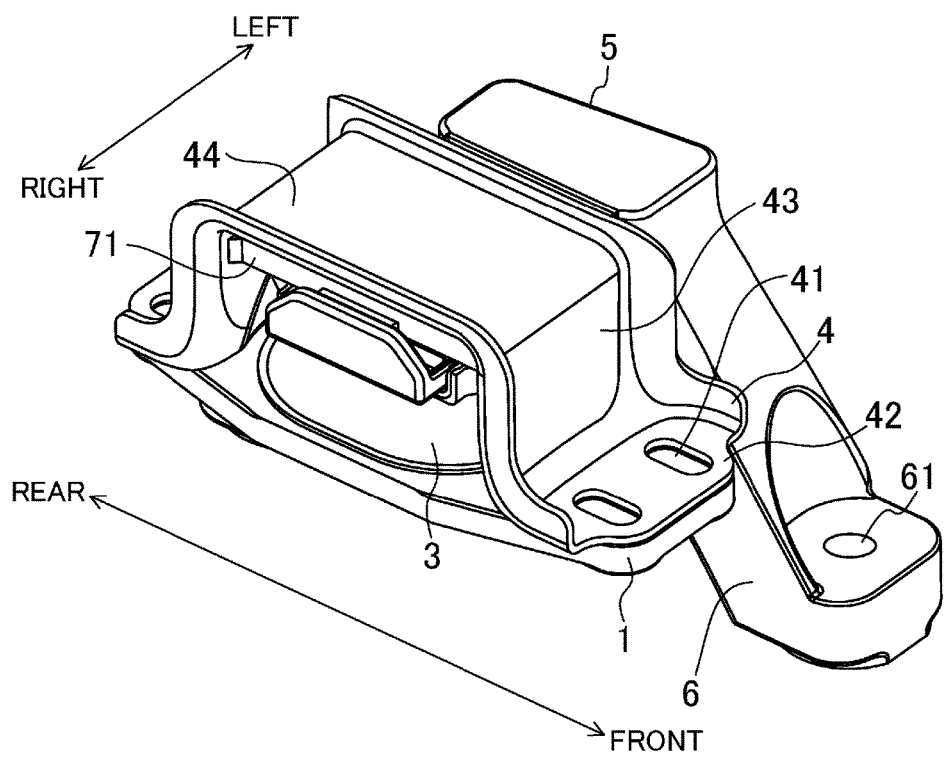
FIG. 6 corresponds to FIG. 1 and illustrates an engine mounting structure according to a third embodiment.
Figure 7:
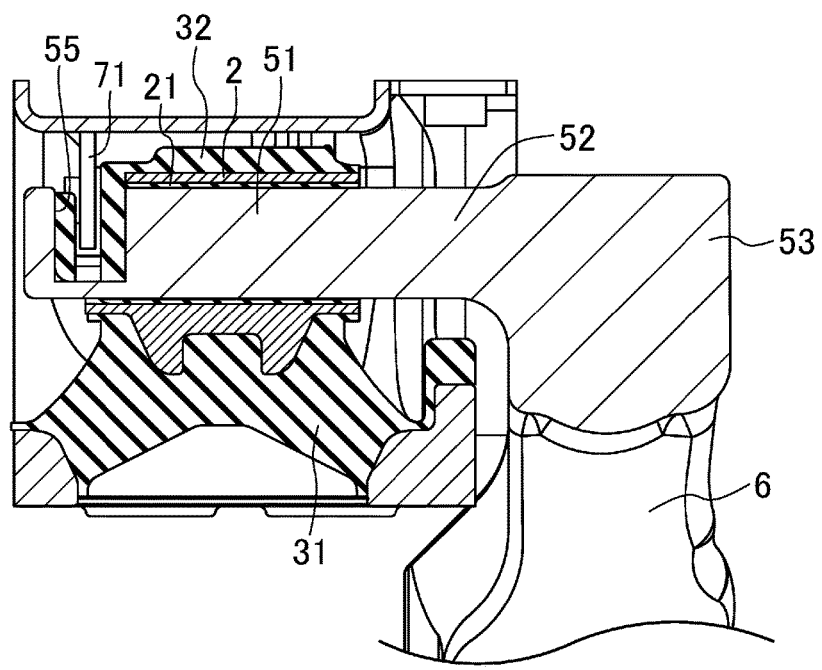
FIG. 7 corresponds to FIG. 4 and illustrates the engine mounting structure according to the third embodiment.

FIGS. 6 and 7 illustrate a third embodiment. In this third embodiment, a recess 55 which is a bottomed-end depression is provided to the insert 51 of the spindle 5, and acts as an engagement portion. Inside this recess 55, the vibration isolator 32 of the elastic support 3 is extended partially to cover an interior wall face of the recess 55. Meanwhile, a lower face of the top plate 44 of the stopper 4 has a protruding plate 71 protruding downward. Acting as a coupler, the protruding plate 71 is inserted into, and engages with, the recess 55. This protruding plate 71 makes contact with the vibration isolator 32 provided on the interior wall face of the recess 55, and engages with the recess 55. This embodiment can also achieve an effect similar to that in the first embodiment. In particular, the embodiment can reliably reduce the risk of the spindle 5 coming off as seen in the first and second embodiments.

Fourth Embodiment

Figure 8:
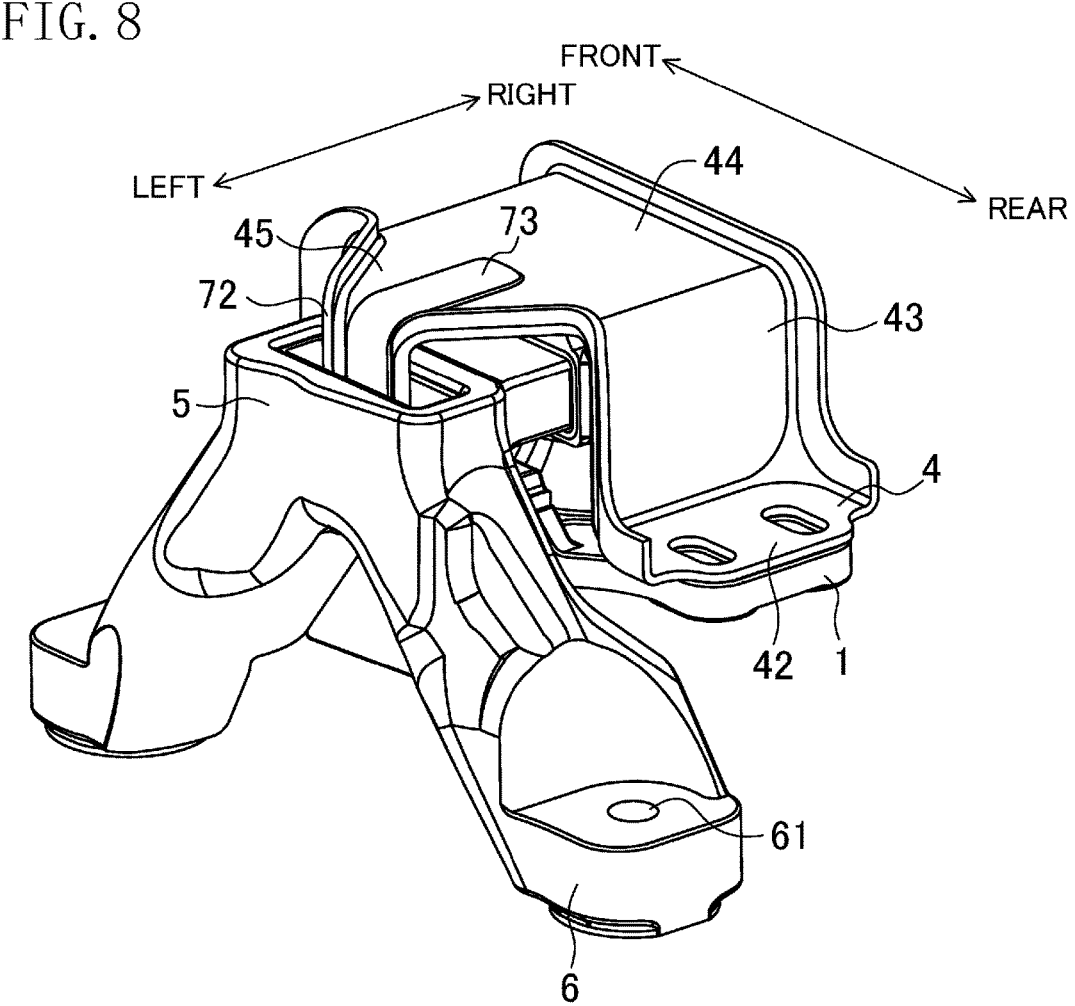
FIG. 8 corresponds to FIG. 2 and illustrates an engine mounting structure according to a fourth embodiment.
Figure 9:
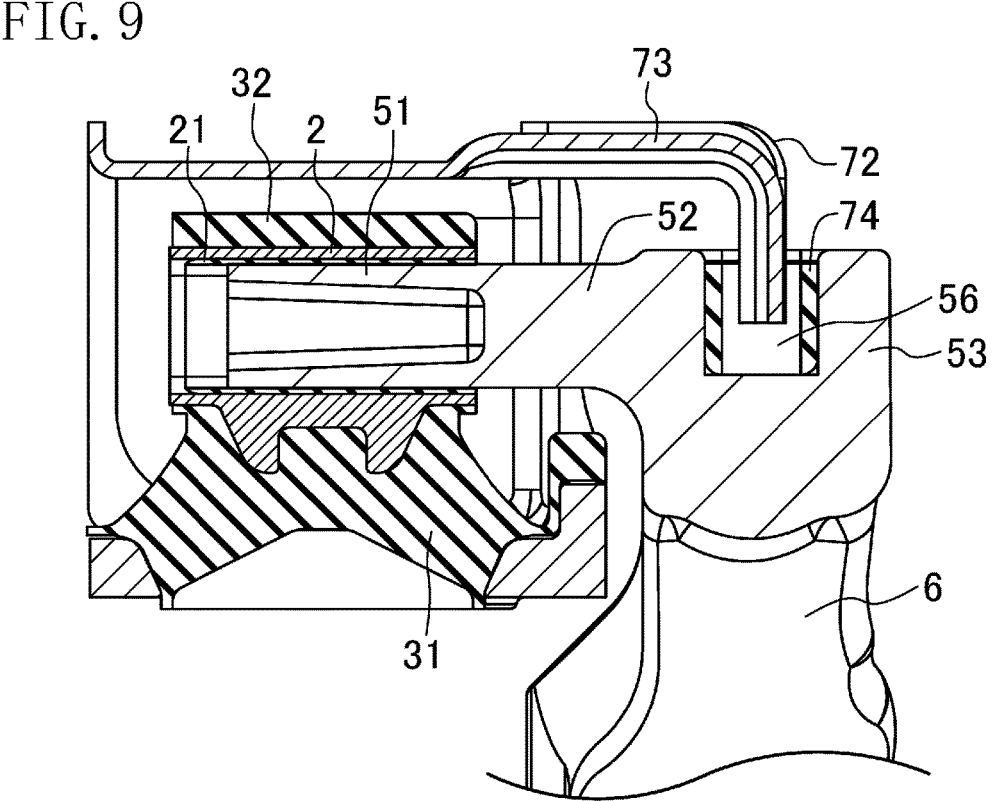
FIG. 9 corresponds to FIG. 4 and illustrates an engine mounting structure according to the fourth embodiment.

FIGS. 8 and 9 illustrate a fourth embodiment. In this embodiment, a recess 56 which is a bottomed-end depression is provided to an upper face of the base 53 in the spindle 5, and acts as an engagement portion. Inside this recess 56, an elastic material 74 is housed to surround an interior wall face of the recess 56. Meanwhile, a fitting portion 72 is integrally provided to the top plate 44 of the stopper 4. Acting as a coupler, the fitting portion 72 extends toward the left from the extending portion 45. The fitting portion 72 includes a bulge 73 provided to the center upper face of the extending portion 45 in the front-rear direction. The left end of this fitting portion 72 is folded downward and engages with the recess 56. This engagement reduces the risk of the spindle 5 coming off. This embodiment can also reliably reduce the risk of the spindle 5 coming off as seen in the first and second embodiments.

INDUSTRIAL APPLICABILITY

As can be seen, the technique disclosed in this description is significantly useful for an engine mounting structure.

DESCRIPTION OF REFERENCE CHARACTERS

1 Lower Rigid Member
11 Opening
2 Upper Rigid Member
21 Coat
22 Protrusion Coat
3 Elastic Support
31 Leg
32 Vibration Isolator
4 Stopper
41 Fastening Hole
42 Flange
43 Leg
44 Top Plate
45 Extending Portion
46 Opening
47 Flange
48 Depression
49 End Face
5 Spindle
51 Insert
52 Root
53 Base
54 Protrusion
55 Recess
56 Recess
6 Transmission Support
61 Support Hole 71 Protruding Plate
72 Fitting Portion
73 Bulge
74 Elastic Material

The invention claimed is:

1. An engine mounting structure for mounting an automotive engine on an automotive body and supporting the automotive engine, the engine mounting structure comprising:
   a spindle to an engine;
   a lower rigid member secured to the body;
   an upper rigid member provided above the lower rigid member, and supporting the spindle, the spindle being inserted into the upper rigid member;
   an elastic support connecting the upper rigid member to the lower rigid member and supporting the upper rigid member in a manner that the upper rigid member is movable with respect to the lower rigid member; and
   a rigid stopper provided to cover from above the upper rigid member and the elastic support, and secured to the lower rigid member, wherein
   the spindle is provided with an engagement portion, and the stopper is provided with a coupler engaging with the engagement portion, and
   the engagement portion engages with the coupler so that a movement of the spindle in a direction of the reception is regulated.

2. The engine mounting structure of claim 1, wherein
   the engagement portion is a protrusion, and
   the coupler is either an opening or a recess engaging with the protrusion.

3. The engine mounting structure of claim 2, wherein
   the stopper includes an extending portion extending above a root of the spindle, and
   the engagement portion is provided facing upward to the root of the spindle, and the coupler is provided to the extending portion of the stopper.

* * * * *